United States Patent [19]
Holik et al.

[11] 4,172,068
[45] * Oct. 23, 1979

[54] FOUNDRY CORE COMPOSITION OF AGGREGATE AND A BINDER THEREFOR

[75] Inventors: Melville J. Holik, Franklin Park, Ill.; John F. Kraemer, Terre Haute, Ind.

[73] Assignee: International Minerals & Chemical Corporation, Terre Haute, Ind.

[*] Notice: The portion of the term of this patent subsequent to Sep. 27, 1994, has been disclaimed.

[21] Appl. No.: 927,700

[22] Filed: Jul. 24, 1978

[51] Int. Cl.$^2$ .......................... C08K 3/36; C08K 5/06
[52] U.S. Cl. ............................ 260/33.2 R; 260/37 N
[58] Field of Search ........ 260/33.2 R, 37 N, DIG. 40

[56] References Cited

U.S. PATENT DOCUMENTS

| 3,403,721 | 10/1968 | Robins et al. ............... 260/DIG. 40 |
| 3,965,051 | 6/1976 | Markusch et al. ............ 260/37 N X |
| 4,051,092 | 9/1977 | Holik et al. ................. 260/DIG. 40 |

Primary Examiner—Sandra M. Person
Attorney, Agent, or Firm—Robert H. Dewey; Howard E. Post

[57] ABSTRACT

A foundry core composition of foundry aggregate, a polyol component or mixture thereof, a polyisocyanate, and as a selected solvent therefor, an acetal or ketal such as butyl acetal. The compositions are suitable for use in cold box, no-bake, and rapid no-bake processes.

7 Claims, No Drawings

FOUNDRY CORE COMPOSITION OF AGGREGATE AND A BINDER THEREFOR

BACKGROUND OF THE INVENTION

This invention relates to an improved foundry core mix. In a more particular aspect, this invention relates to components of an improved core binder system.

Cores useful in making metal castings are customarily made by placing a foundry aggregate, usually silica sand which has been admixed with a suitable binder, against a shape or pattern and then hardening the binder, as by polymerization. The resulting core is a self-supporting structure which forms a part of a mold assembly.

Various sands are used for making cores. The cores themselves are made by a variety of processes employing a wide variety of binders. Three of the many processes in commercial use today are the so-called cold box process, no-bake process and the rapid no-bake process. The cold box process is one in which sand is admixed with a suitable resinous binder composition, blown into a core box, and then gassed with a suitable vapor phase catalyst to cure the binder. By such process, which is described for example in U.S. Pat. No. 3,409,579, a core of sufficient hardness to be stripped from the core box is produced in a matter of seconds. The no-bake process is one in which a resinous core binder is admixed with a catalyst and sand and placed in a core box. The core cures at ambient temperatures but much more slowly than in the cold box process, over a period of hours or even days. After a suitable period of time, such as two hours, the core can generally be stripped from the core box, but requires further cure time. The rapid no-bake process is similar to the no-bake process, but the character of the resin and the amount and type of catalyst employed are such that a core is formed and may be stripped from the core box in a matter of a few minutes. The bench life, or time period during which a sand-resin mixture may be kept before the reaction proceeds to a detrimental extent prior to placing the mixture into the core box, generally decreases rapidly when the catalyst and resin are adjusted to provide very rapid set times. Therefore, the development of the rapid no-bake process was dependent upon the availability of foundry machines which were capable of mixing small but accurately controlled amounts of resin, catalyst and sand and transferring the admixture substantially immediately into a core box. Processes of this type are described, for example, in U.S. Pat. No. 3,702,316.

The subject invention provides a binder system which is suitable for use in all three of these processes by adding a suitable catalyst immediately before use. It will be understood that the kind and amount of catalyst employed will be such as to adapt the final binder-sand admixture to the intended purpose. That is, in the cold box process, the catalyst will typically be a gaseous amine, such as triethylamine, dispersed in a suitable carrier such as carbon dioxide. In the no-bake and rapid no-bake process, amine catalysts and conventional metal catalysts such as lead naphthenate or dibutyl tin dilaurate are employed in amounts adjusted to provide the desired set time.

DESCRIPTION OF THE INVENTION

It is an object of this invention to provide an improved foundry core mix.

It is another object of this invention to provide components of an improved core binder system.

Other objects will be apparent to those skilled in the art from the description herein.

Briefly, a foundry mix of this invention comprises foundry aggregate and about 1% to 5%, based upon the weight of the aggregate of a binder capable of being cured by a catalyst comprising:

(a) a polyol component reactive with, (b) a liquid polyisocyanate component in the amount of about 60% to 70% by weight of the polyol, and, (c) a solvent of the formula

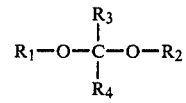

in which $R_1$ and $R_2$ are the same or different hydrocarbon radicals of three to six carbon atoms and $R_3$ and $R_4$ are the same or different hydrogen, methyl, ethyl or phenyl radicals. The solvent is present in the amount of about 10% to 40% by weight of the total binder system.

Surprisingly, a core prepared in the presence of the solvent of the above formula possessed a far higher tensile strength—about twice as high—as did a core prepared in the presence of a conventional aromatic solvent.

The binder composition is conveniently provided in two components or packages. One contains the polyol component the other the isocyanate. In a preferred embodiment of the invention, both the isocyanate and the polyol component will be dissolved or dispersed in the selected solvent. The amount and type of solvent in each package may vary provided the total amount of selected solvent present in the polyolisocyanate mixture is within the limits specified. Preferred are binder compositions in which the selected solvent is present in the amount of about 30–40% by weight of the binder composition.

The polyisocyanates which can be used in accordance with this invention are those known to be useful in the preparation of foundry core binders. Such polyisocyanates, which will hereinafter be called reactive polyisocyanates, include the aliphatic polyisocyanates such as hexamethylene diisocyanate, alicyclic polyisocyanates such as 4,4-dicyclohexylmethane diisocyanate and aromatic polyisocyanates such as 3,4- and 2,6-toluene diisocyanate, diphenylmethyl diisocyanate, and the dimethyl derivatives thereof. Other suitable polyisocyanates are 1,5-naphthalene diisocyanate, triphenylmethane triisocyanate, xylylene diisocyanate, and the methyl derivatives thereof, polymethylenepolyphenyl isocyanates, and chlorophenylene-2,4-diisocyanate. Preferred, however, is the use of commercially available compositions which contain diphenylmethane diisocyanate, and triphenylmethane triisocyanate.

Polyols useful in the practice of this invention include those reactive with the isocyanate component. More particularly, it is contemplated that a mixture of bisphenol A and an alkylene glycol will form the polyol component. Tetraethylene glycol is a preferred alkylene glycol. The bisphenol A and alkylene glycol are employed in weight ratio of about 1.5–2.5:1, respectively, preferably about 2:1. The polyol component is employed in a weight ratio of about 5–7 parts to 10 parts of polyisocyanate component, preferably about 6 parts to 10 parts.

The selected solvents used in accordance with the invention are compounds of the formula

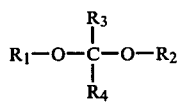

in which $R_1$ and $R_2$ are the same or different hydrocarbon radicals of three to six carbon atoms, and $R_3$ and $R_4$ are the same or different methyl, ethyl, phenyl or hydrogen radicals. Preferred are compounds in which $R_3$ and $R_4$ are hydrogen. Especially preferred is di-butoxymethane. Useful solvents are dipropoxymethane, diisobutoxymethane, dipentyloxymethane, dihexyloxymethane, and dicyclohexyloxymethane. Other solvents which may be used include n-butoxyisopropoxymethane, isobutoxybutoxymethane and isopropoxypentyloxymethane. Among the useful solvents in which $R_3$ or $R_4$ are other than hydrogen are acetaldehyde n-propyl acetal, benzaldehyde n-butyl acetal, acetaldehyde n-butyl acetal, acetone di-n-butyl ketal, and acetophenone dipropyl ketal.

In the preparation of cores suitable for foundry use, the binder (which comprises the polyol component, polyisocyanate, solvent, and sometimes a catalyst) is employed in an amount in the range of 1% to 5% by weight of the foundry sand, and generally in the amount of about 2% by weight of the sand. The binder and sand are mixed in a muller or other device suitable for evenly distributing the binder on the sand in keeping with the requirements of the specific processes by which the cores are made. These processes are conventional and form no part of the instant invention.

As before described, a catalyst is sometimes employed and its selection will depend upon the specific process by which the core is made. In the cold box process, the catalyst is generally an amine such as triethylamine; the sand is coated with binder in the absence of catalyst, and placed in a core box. The amine catalyst is vaporized into a gaseous substance, such as carbon dioxide, and blown through the core box to catalyze the reaction of the binder. In a foundry process such as the no-bake process or rapid no-bake process, either liquid amine catalysts or metal catalysts may be employed. Metal catalysts such as lead naphthenate or dibutyl tin dilaurate are preferred.

Generally such catalysts are used in amounts from 0.0001 to 0.04 by weight of the polyol component. The catalysis of resin polyisocyanate binder systems in the foundry art is well known. The amount and type of catalyst is adapted to provide the desired speed of reaction in accordance with the parameters of the specified process in which the binder is employed.

Catalysts suitable for curing the binder of the present invention are well known in the art and form no part of this invention.

The invention will be better understood with reference to the following example. It is to be understood, however, that this example is intended only to illustrate the invention, and it is not intended that the invention be limited thereby.

EXAMPLE 1

A polyol resin component was prepared by mixing the ingredients listed in Table 1:

Table 1

| | |
|---|---|
| Bisphenol A | 4.1 g |
| Tetraethylene glycol | 2.2 g |
| Isophorone | 5.5 g |

The resulting product was mixed with polydiphenylmethane diisocyanate 10 g (Mondur MR sold by Mobay Chemical Corporation was used) dissolved in 2 g of isophorone to form the binder composition. For comparison, a similar mixture was prepared but in this case the Mondur MR was dissolved in 4.8 g of butylal instead of isophorone. The binder (isocyanate component and resin component) was applied to 1200 g of Portage sand in a muller and was tested in a cold box system, the test core being gassed with triethylamine vapor. The results obtained are given in Table 2:

Table 2

| Test | Polyisocyanate Component | Strip Tensile Strength |
|---|---|---|
| 1 | 10 g Mondur MR + 2 g Isophorone | 99, 94, 102 |
| 2 | 9.2 g Mondur MR + 4.8 g Butylal | 183, 237, 190 |

The advantage of the use of butylal, the selected solvent of this invention, is evident and surprising.

We claim:

1. A foundry core mix adapted to being cured by a catalyst comprising a foundry aggregate and about 1% to 5% by weight of the aggregate of a binder comprising:
    (a) a polyol component reactive with,
    (b) a liquid polyisocyanate component in the amount of about 60% to 70% by weight of the polyol, and,
    (c) a solvent of the formula

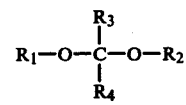

in which $R_1$ and $R_2$ are the same or different hydrocarbon radicals of three to six carbon atoms and $R_3$ and $R_4$ are the same or different hydrogen, methyl, ethyl or phenyl radicals.

2. The foundry core mix of claim 1 wherein the polyol component is a mixture of bisphenol A and a polyalkylene glycol.

3. The foundry core mix of claim 2 wherein the polyalkylene glycol is tetraethylene glycol.

4. The foundry core mix of claim 3 wherein the bisphenol A and tetraethylene glycol are in a weight ratio of about 1.5-2.5:1.

5. The foundry core mix of claim 1 wherein the solvent is present in the amount of about 30-40% by weight of the binder.

6. The foundry core mix of claim 5 wherein the solvent is butylal.

7. The foundry core mix of claim 1 wherein the polyol component is present in an amount of about 5-7 parts by weight per 10 parts of polyisocyanate.

* * * * *